US006821652B1

(12) United States Patent
Okamoto et al.

(10) Patent No.: US 6,821,652 B1
(45) Date of Patent: Nov. 23, 2004

(54) MAGNETIC RECORDING MEDIUM AND MAGNETIC STORAGE APPARATUS

(75) Inventors: Iwao Okamoto, Kawasaki (JP); E. Noel Abarra, Kawasaki (JP); Yoshifumi Mizoshita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/588,923

(22) Filed: Jun. 6, 2000

Related U.S. Application Data

(63) Continuation-in-part of application No. 09/425,788, filed on Oct. 22, 1999.

(30) Foreign Application Priority Data

Jun. 8, 1999 (JP) .............................................. 11-161329
Apr. 7, 2000 (JP) ....................................... 2000-107076

(51) Int. Cl.[7] ............................... G11B 5/66; G11B 5/70
(52) U.S. Cl. ......................... 428/694 TM; 428/694 TS; 428/336; 428/900
(58) Field of Search ..................... 428/694 TM, 694 TS, 428/900, 336, 694 EC

(56) References Cited

U.S. PATENT DOCUMENTS

| | | | |
|---|---|---|---|
| 4,677,032 A | 6/1987 | Robinson | 428/611 |
| 4,789,598 A | 12/1988 | Howard et al. | 428/408 |
| 5,051,288 A | 9/1991 | Ahlert et al. | 428/641 |
| 5,147,732 A | 9/1992 | Shiroishi et al. | 428/668 |
| 5,408,377 A | 4/1995 | Gurney et al. | 360/113 |
| 5,462,796 A | 10/1995 | Teng et al. | 428/336 |
| 5,465,185 A | 11/1995 | Heim et al. | 360/113 |
| 5,493,465 A | 2/1996 | Kamiguchi et al. | 360/113 |
| 5,523,173 A | 6/1996 | Doerner et al. | 428/611 |
| 5,580,667 A | 12/1996 | Lal et al. | 428/610 |
| 5,607,740 A | 3/1997 | Noda | 428/65.3 |
| 5,688,380 A | 11/1997 | Koike et al. | 204/192.1 |
| 5,693,426 A | 12/1997 | Lee et al. | 428/611 |

(List continued on next page.)

FOREIGN PATENT DOCUMENTS

| | | |
|---|---|---|
| DE | 197 00 506 A1 | 7/1997 |
| EP | 0892393 A1 | 1/1999 |
| GB | 2355018 A | 4/2001 |

(List continued on next page.)

OTHER PUBLICATIONS

Akopyan et al., "Study of a change in the lattice constant of a ruthenium–based ternary solid solution by mathematical planning of an experiment", Izv. Akad. Nauk SSSR, Met., (1976) (3), 210–214.*

Ounadjela et al., Field–dependent antiferro–ferromagnetic transition in Co/Ru superlattices, J. Appl. Phys., Nov. 15, 1991, vol. 70, Issue 10, p. 5877.*

M. Venkatraman and J.P. Neumann, CR–Ru (Chromium–Ruthenium), "Binary Alloy Phase Diagrams," Second Edition, 1990, ASM International pp. 1322–1323.

(List continued on next page.)

*Primary Examiner*—Holly Rickman
(74) *Attorney, Agent, or Firm*—Greer, Burns & Crain, Ltd.

(57) ABSTRACT

A magnetic recording medium is constructed to include at least one exchange layer structure, and a magnetic layer formed on the exchange layer structure, where the exchange layer structure comprises a ferromagnetic layer, and a non-magnetic coupling layer provided on the ferromagnetic layer and under the magnetic layer. The ferromagnetic layer and the magnetic layer have antiparallel magnetizations. The non-magnetic coupling layer is made of a Ru-M3 alloy, where M3 is an added element or alloy, and a lattice mismatch between the non-magnetic coupling layer and the magnetic layer and the ferromagnetic layer respectively disposed above and below the non-magnetic coupling layer is adjusted to approximately 6% or less by addition of M3.

8 Claims, 10 Drawing Sheets

U.S. PATENT DOCUMENTS

| | | | |
|---|---|---|---|
| 5,701,223 A | 12/1997 | Fontana, Jr. et al. | 360/113 |
| 5,736,262 A | 4/1998 | Ohkijima et al. | 428/611 |
| 5,756,202 A | 5/1998 | Van Kesteren et al. | 428/332 |
| 5,820,963 A | 10/1998 | Lu et al. | 428/65.3 |
| 5,834,111 A | 11/1998 | Lal et al. | 428/332 |
| 5,840,394 A | 11/1998 | Ranjan et al. | 428/65.3 |
| 5,843,569 A | 12/1998 | Kaitsu et al. | 428/323 |
| 5,851,643 A | 12/1998 | Honda et al. | 428/212 |
| 5,851,656 A | 12/1998 | Ohkubo | 428/332 |
| 5,898,549 A | 4/1999 | Gill | 360/113 |
| 5,922,456 A | 7/1999 | Tanahashi et al. | 428/332 |
| 5,954,927 A | 9/1999 | Kobayashi et al. | 204/192.2 |
| 6,013,365 A | 1/2000 | Dieny et al. | 428/332 |
| 6,077,586 A | 6/2000 | Bian et al. | 428/65.3 |
| 6,143,388 A | 11/2000 | Bian et al. | 428/65.3 |
| 6,150,016 A | 11/2000 | Song et al. | 428/332 |
| 6,221,481 B1 * | 4/2001 | Wu et al. | 428/332 |
| 6,248,395 B1 | 6/2001 | Homola et al. | 427/129 |
| 6,261,681 B1 * | 7/2001 | Suekane et al. | 428/332 |
| 6,280,813 B1 * | 8/2001 | Carey et al. | 428/65.3 |
| 6,372,330 B1 | 4/2002 | Do et al. | 428/212 |
| 2001/0038931 A1 | 11/2001 | Carey et al. | 428/694 |
| 2002/0098390 A1 | 7/2002 | Do et al. | 428/694 TS |

FOREIGN PATENT DOCUMENTS

| | | |
|---|---|---|
| JP | 06-349047 | 12/1994 |
| JP | 07-121863 | 5/1995 |
| JP | 07-134820 | 5/1995 |
| JP | 07-176027 | 7/1995 |
| JP | 08-129738 | 5/1996 |
| JP | 09-147349 | 6/1997 |
| JP | 09-198641 | 7/1997 |
| JP | 10-040528 | 2/1998 |
| JP | 10-149526 A | 6/1998 |
| JP | 10-289434 | 10/1998 |
| JP | 1173621 | 3/1999 |
| JP | 11328646 A | 11/1999 |
| WO | WO9624927 | 8/1996 |
| WO | WO9734295 | 9/1997 |

OTHER PUBLICATIONS

Baibich et al., "*Giant Magnetoresistance of (001)Fe(001)CR Magnetic Superlattices,*" Physical Review Letters, vol. 61, No. 21, Nov. 21, 1988.

S.E. Lambert, et al., "Reduction of Media Noise in Thin Film Metal Media by Lamination"–IEEE Transactions on Magnetics, vol. 26, No. 5, Sep. 1990, pp. 2706–2708.

E.S. Murdock, et al., "Noise Properties of Multilayered Co–Alloy Magnetic Recording Media"–IEEE Transactions on Magnetics, vol. 26, No. 5, Sep. 1990, pp. 2700–2705.

A. Murayama, et al., "Interlayer Exchange Coupling in Co/Cr/Co Double Layered Recording Films Studied by Spin–Wave Brillouin Scattering"–IEEE Transactions on Magnetics, vol. 27, No. 6, Nov. 1991, pp. 5064–5066.

S.E. Lambert, et al., "Laminated Media for High Density Recording"–IEEE Transactions on Magnetics, vol. 29, No. 1, Jan. 1993, pp. 223–229.

E. Teng, et al., "Flash Chromium Interlayer for High Performance Disks with Superior Noise and Coercivity Squareness"–IEEE Transactions on Magnetics, vol. 29, No. 6, Nov. 1993, pp. 3679–3681.

S.S.P. Parkin et al., "Oscillations in Exchange Couplng and Magnetoresistance in Metallic Superlattice Structures: Co/Ru, Co/Cr, and Fe/Cr", Physical Review Letters, vol. 64, No. 19, May 7, 1990, pp. 2304–2307.

Okamoto et al.; "Rigid Disk Medium for 5 $Gb/in^2$ Recording;" *IEEE Intermag 1996 Digest.*

Hosoe et al.; "Experimental Study of Thermal Decay in High–Density Magnetic Recording Media;" *IEEE Trans. Magn.;* vol. 33, p. 1528; 1997.

Lu et al.; "Thermal Instability at 10 $Gb/in^2$ Magnetic Recording;" *IEEE Trans. Magn.;* vol. 30, No. 6, pp. 4230–4232; Nov. 1994.

Abarra et al.; "Thermal Stability of Narrow Track Bits in a 5 $Gb/in^2$ Medium;" *IEEE Trans. Magn.;* vol. 33, p. 2995; 1997.

He et al.; "High–Speed Switching in Magnetic Recording Media;" *Journal of Magnetism and Magnetic Materials;* vol. 155, pp. 6–12; 1996.

Akimoto et al.; "Relationship Between Magnetic Circumferential Orientation and Magnetic Thermal Stability;" *J. Magn. Magn. Mater.;* 1999.

Abarra et al.; "The Effect of Orientation Ratio on the Dynamic Coercivity of Media for >15 5 $Gb/in^2$ Recording;" EB–02, *Intermag.;* Korea; 1999.

Richter et al.; "Dynamic Coercivity Effects in Thin Film Media;" *IEEE Trans. Magn.,* vol. 34, p. 1540; 1997.

Lu et al.; "Magnetic Viscosity in High–Density Recording;" *J. Appl. Phys.,* vol. 75, p. 5768; 1994.

S.S.P. Parkin; "Systematic Variation of the Strength and Oscillation Period of Indirect Magnetic Exchange Coupling Through the 3d, 4d, and 5d Transition Metals;" *Phys. Rev. Lett.,* vol. 67, p. 3598; 1991.

Pu–Ling Lu and Stanley H. Charap; "High Density Magnetic Recording Media Design and Identification: Susceptibility to Thermal Decay;" *IEEE Transactions on Magnetics,* vol. 31, No. 6; Nov. 1995.

Y. Kawato et al.; "Spin Valve Films with Synthetic Ferrimagnets (Co/Ru/Co) for Pinned Layers;" (source and year unknown).

* cited by examiner

MAGNETIC RECORDING MEDIUM AND MAGNETIC STORAGE APPARATUS

This application is a Continuation-In-Part Application of a U.S. patent application Ser. No. 09/425,788 pending filed Oct. 22, 1999.

BACKGROUND OF THE INVENTION

1. Field of the Invention

The present invention generally relates to magnetic recording media and magnetic storage apparatuses, and more particularly to a magnetic recording medium and a magnetic storage apparatus which are suited for high-density recording.

2. Description of the Related Art

The recording density of longitudinal magnetic recording media, such as magnetic disks, has been increased considerably, due to the reduction of medium noise and the development of magnetoresistive and high-sensitivity spin-valve heads. A typical magnetic recording medium is comprised of a substrate, an underlayer, a magnetic layer, and a protection layer which are successively stacked in this order. The underlayer is made of Cr or a Cr-based alloy, and the magnetic layer is made of a Co-based alloy.

Various methods have been proposed to reduce the medium noise. For example, Okamoto et al., "Rigid Disk Medium For 5 Gbit/in$^2$ Recording". AB-3. Intermag '96 Digest proposes decreasing the grain size and size distribution of the magnetic layer by reducing the magnetic layer thickness by the proper use of an underlayer made of CrMo, and a U.S. Pat. No. 5,693,426 proposes the use of an underlayer made of NiAl. Further, Hosoe et al., "Experimental Study of Thermal Decay in High-Density Magnetic Recording Media", IEEE Trans. Magn. Vol. 33, 1528 (1997), for example, proposes the use of an underlayer made of CrTiB. The underlayers described above also promote c-axis orientation of the magnetic layer in a plane which increases the remanence magnetization and the thermal stability of written bits. In addition, proposals have been made to reduce the thickness of the magnetic layer, to increase the resolution or to decrease the width of transition between written bits. Furthermore, proposals have been made to decrease the exchange coupling between grains by promoting more Cr segregation in the magnetic layer which is made of the CoCr-based alloy.

However, as the grains of the magnetic layer become smaller and more magnetically isolated from each other, the written bits become unstable due to thermal activation and to demagnetizing fields which increase with linear density. Lu et al., "Thermal Instability at 10 Gbit/in$^2$ Magnetic Recording", IEEE Trans. Magn. Vol. 30, 4230 (1994) demonstrated, by micromagnetic simulation, that exchange-decoupled grains having a diameter of 10 nm and ratio $K_u V/k_B T$-60 in 400 kfci di-bits are susceptible to significant thermal decay, where $K_u$ denotes the magnetic anisotropy constant, V denotes the average magnetic grain volume, $k_B$ denotes the Boltzmann constant, and T denotes the temperature. The ratio $K_u V/k_B T$ is also referred to as a thermal stability factor.

It has been reported in Abarra et al., "Thermal Stability of Narrow Track Bits in a 5 Gbit/in$^2$ Medium", IEEE Trans. Magn. Vol. 33, 2995 (1997) that the presence of intergranular exchange interaction stabilizes written bits, by MFM studies of annealed 200 kfci bits on a 5 Gbit/in$^2$ CoCrPtTa/CrMo medium. However, more grain decoupling is essential for recording densities of 20 Gbit/in$^2$ or greater.

The obvious solution has been to increase the magnetic anisotropy of the magnetic layer. But unfortunately, the increased magnetic anisotropy places a great demand on the head write field which degrades the "overwrite" performance which is the ability to write over previously written data.

In addition, the coercivity of thermally unstable magnetic recording medium increases rapidly with decreasing switching time, as reported in He et al., "High Speed Switching in Magnetic Recording Media", J. Magn. Magn. Mater. Vol. 155, 6 (1996), for magnetic tape media, and in J. H. Richter, "Dynamic Coercivity Effects in Thin Film Media". IEEE Trans. Magn. Vol. 34, 1540 (1997), for magnetic disk media. Consequently, the adverse effects are introduced in the data rate, that is, how fast data can be written on the magnetic layer and the amount of head field required to reverse the magnetic grains.

On the other hand, another proposed method of improving the thermal stability increases the orientation ratio of the magnetic layer, by appropriately texturing the substrate under the magnetic layer. For example, Akimoto et al., "Relationship Between Magnetic Circumferential Orientation and Magnetic Thermal Stability", J. Magn. Magn. Mater. (1999), in press, report through micromagnetic simulation, that the effective ratio $K_u V/k_B T$ is enhanced by a slight increase in the orientation ratio. This further results in a weaker time dependence for the coercivity which improves the overwrite performance of the magnetic recording medium, as reported in Abarra et al., "The Effect of Orientation Ratio on the Dynamic Coercivity of Media for >15 Gbit/in$^2$ Recording", EB-02, Intermag '99, Korea.

Furthermore, keepered magnetic recording media have been proposed for thermal stability improvement. The keeper layer is made up of a magnetically soft layer parallel to the magnetic layer. This soft layer can be disposed above or below the magnetic layer. Oftentimes, a Cr isolation layer is interposed between the soft layer and the magnetic layer. The soft layer reduces the demagnetizing fields in written bits on the magnetic layer. However, coupling the magnetic layer to a continuously-exchanged coupled soft layer defeats the purpose of decoupling the grains of the magnetic layer. As a result, the medium noise increases.

Various methods have been proposed to improve the thermal stability and to reduce the medium noise. However, there was a problem in that the proposed methods do not provide a considerable improvement of the thermal stability of written bits, thereby making it difficult to greatly reduce the medium noise. In addition, there was another problem in that some of the proposed methods introduce adverse effects on the performance of the magnetic recording medium due to the measures taken to reduce the medium noise.

More particularly, in order to obtain a thermally stable performance of the magnetic recording medium, it is conceivable to (i) increase the magnetic anisotropy constant $K_u$, (ii) decrease the temperature T or, (iii) increase the grain volume V of the magnetic layer. However, measure (i) increases the coercivity, thereby making it more difficult to write information on the magnetic layer. In addition, measure (ii) is impractical since in magnetic disk drives, for example, the operating temperature may become greater than 60° C. Furthermore, measure (iii) increases the medium noise as described above. As an alternative for measure (iii), it is conceivable to increase the thickness of the magnetic layer, but this would lead to deterioration of the resolution.

SUMMARY OF THE INVENTION

Accordingly, it is a general object of the present invention to provide a novel and useful magnetic recording medium and magnetic storage apparatus, in which the problems described above are eliminated.

Another and more specific object of the present invention is to provide a magnetic recording medium and a magnetic storage apparatus, which can improve the thermal stability of written bits without increasing the medium noise, so as to enable a reliable high-density recording without introducing adverse effects on the performance of the magnetic recording medium, that is, unnecessarily increasing the magnetic anisotropy, and can improve the recording resolution by improving the in-plane crystal orientation of the magnetic layer.

Still another object of the present invention is to provide a magnetic recording medium characterized by at least one exchange layer structure; and a magnetic layer formed on the exchange layer structure, the exchange layer structure comprising a ferromagnetic layer, and a non-magnetic coupling layer provided on the ferromagnetic layer and under the magnetic layer, the ferromagnetic layer and the magnetic layer having antiparallel magnetizations, and the non-magnetic coupling layer being made of a Ru-M3 alloy, where M3 is an added element or alloy, and a lattice mismatch between the non-magnetic coupling layer and the magnetic layer and the ferromagnetic layer respectively disposed above and below the non-magnetic coupling layer is adjusted to approximately 6% or less by addition of M3. According to the magnetic recording medium of the present invention, it is possible to provide a magnetic recording medium which can improve the thermal stability of written bits, so as to enable reliable high-density recording without degrading the overwrite performance, and to improve the recording resolution by improving the in-plane crystal orientation of the magnetic layer.

A further object of the present invention is to provide a magnetic recording medium characterized by at least one exchange layer structure; and a magnetic layer formed on the exchange layer structure, the exchange layer structure comprising a ferromagnetic layer, and a non-magnetic coupling layer provided on the ferromagnetic layer and under the magnetic layer, the ferromagnetic layer and the magnetic layer having antiparallel magnetizations, the non-magnetic coupling layer being made of a Ru-M3 alloy, where M3=Co, Cr, Fe, Ni, Mn or alloys thereof. According to the magnetic recording medium of the present invention, it is possible to provide a magnetic recording medium which can improve the thermal stability of written bits, so as to enable reliable high-density recording without degrading the overwrite performance, and to improve the recording resolution by improving the in-plane crystal orientation of the magnetic layer.

Another object of the present invention is to provide a magnetic storage apparatus comprising at least one magnetic recording medium of any of the types described above. According to the magnetic storage apparatus of the present invention, it is possible to provide a magnetic recording medium which can improve the thermal stability of written bits, so as to enable reliable high-density recording without degrading the overwrite performance, and to improve the recording resolution by improving the in-plane crystal orientation of the magnetic layer.

Other objects and further features of the present invention will be apparent from the following detailed description when read in conjunction with the accompanying drawings.

DESCRIPTION OF THE PREFERRED EMBODIMENTS

Figure 1:
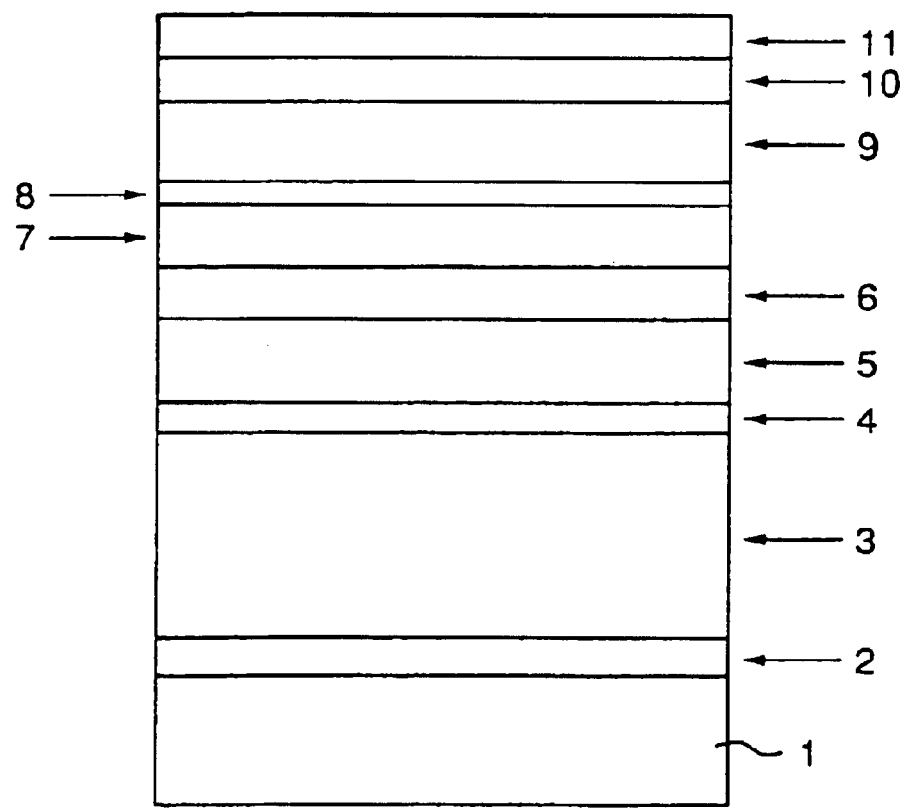
FIG. 1 is a cross sectional view showing an important part of a first embodiment of the magnetic recording medium according to the present invention.

A description will hereinafter be given of embodiments of the present invention, by referring to the drawings.

First, a description will be given of the operating principle of the present invention.

The present invention submits the use of layers with antiparallel magnetization structures. For example, S. S. P. Parkin, "Systematic Variation of the Strength and Oscillation Period of Indirect Magnetic Exchange Coupling through the 3d, 4d, and 5d Transition Metals", Phys. Rev. Lett. Vol. 67, 3598 (1991) describes several magnetic transition metals such as Co, Fe and Ni that are coupled through thin non-magnetic interlayers such as Ru and Rh. On the other hand, a U.S. Pat. No. 5,701,223 proposes a spin-valve which employs the above described layers as laminated pinning layers to stabilize the sensor.

For a particular Ru or Ir layer thickness between two ferromagnetic layers, the magnetizations can be made parallel or antiparallel. For example, for a structure made up of two ferromagnetic layers of different thickness with antiparallel magnetizations, the effective grain size of a magnetic recording medium can be increased without significantly affecting the resolution. A signal amplitude reproduced from such a magnetic recording medium is reduced due to the opposite magnetizations, but this can be rectified by adding another layer of appropriate thickness and magnetization direction, under the laminated magnetic layer structure, to thereby cancel the effect of one of the layers. As a result, it is possible to increase the signal amplitude reproduced from the magnetic recording medium, and to also increase the effective grain volume. Thermally stable written bits can therefore be realized.

The present invention increases the thermal stability of written bits by exchange coupling the magnetic layer to another ferromagnetic layer with an opposite magnetization or, by a laminated ferrimagnetic structure. The ferromagnetic layer or the laminated ferrimagnetic structure is made up of exchange-decoupled grains as the magnetic layer. In other words, the present invention uses an exchange pinning ferromagnetic layer or a ferrimagnetic multilayer to improve the thermal stability performance of the magnetic recording medium.

FIG. 1 is a cross sectional view showing an important part of a first embodiment of a magnetic recording medium according to the present invention.

The magnetic recording medium includes a non-magnetic substrate 1, a first seed layer 2, a NiP layer 3, a second seed layer 4, an underlayer 5, a non-magnetic intermediate layer 6, a ferromagnetic layer 7, a non-magnetic coupling layer 8, a magnetic layer 9, a protection layer 10, and a lubricant layer 11 which are stacked in the order shown in FIG. 1.

For example, the non-magnetic substrate 1 is made of Al. Al alloy or glass. This non-magnetic substrate 1 may or may not be mechanically textured. The first seed layer 2 is made of Cr or Ti, for example, especially in the case where the non-magnetic substrate 1 is made of glass. The NiP layer 3 is preferably oxidized and may or may not be mechanically textured. The second seed layer 4 is provided to promote a (001) or a (112) texture of the underlayer 5 when using a B2 structure alloy such as NiAl and FeAl for the underlayer 5. The second seed layer 4 is made of an appropriate material similar to that of the first seed layer 2.

In a case where the magnetic recording medium is a magnetic disk, the mechanical texturing provided on the non-magnetic substrate 1 or the NiP layer 3 is made in a circumferential direction of the disk, that is, in a direction in which tracks of the disk extend.

The non-magnetic intermediate layer 6 is provided to further promote epitaxy, narrow the grain distribution of the magnetic layer 9, and orient the anisotropy axes of the magnetic layer 9 along a plane parallel to the recording surface of the magnetic recording medium. This non-magnetic intermediate layer 6 is made of a hcp structure alloy such as CoCr-M, where M=B, Mo, Nb, Ta, W or alloys thereof, and has a thickness in a range of 1 to 5 nm.

The ferromagnetic layer 7 is made of Co, Ni. Fe, Co-based alloy, Ni-based alloy, Fe-based alloy or the like. In other words, alloys such as CoCrTa, CoCrPt and CoCrPt-M, where M=B, Mo, Nb, Ta, W, Cu or alloys thereof may be used for the ferromagnetic layer 7. This ferromagnetic layer 7 has a thickness in a range of 2 to 10 nm. The non-coupling magnetic layer 8 is made of Ru, Ir, Rh, Ru-based alloy, Ir-based alloy, Rh-based alloy or the like. This non-magnetic coupling layer 8 preferably has a thickness in a range of 0.4 to 1.0 nm, and preferably on the order of approximately 0.6 to 0.8 nm. For this particular thickness range of the non-magnetic coupling layer 8, the magnetizations of the ferromagnetic layer 7 and the magnetic layer 9 are antiparallel. The ferromagnetic layer 7 and the non-magnetic coupling layer 8 form an exchange layer structure.

For a ferromagnetic layer 7 made of a Fe-based alloy, Cr forms a better non-magnetic coupling layer 8. In this case, the Cr non-magnetic coupling layer 8 has an optimum thickness of approximately 1.8 nm.

The magnetic layer 9 is made of Co or a Co-based alloys such as CoCrTa, CoCrPt and CoCrPt-M, where M=B. Mo. Nb. Ta. W, Cu or alloys thereof. The magnetic layer 9 has a thickness in a range of 5 to 30 nm. Of course, the magnetic layer 9 is not limited to a single-layer structure, and a multi-layer structure may be used for the magnetic layer 9.

The protection layer 10 is made of C, for example. In addition, the lubricant layer 11 is made of an organic lubricant, for example, for use with a magnetic transducer such as a spin-valve head. The protection layer 10 and the lubricant layer 11 form a protection layer structure on the recording surface of the magnetic recording medium.

Obviously, the layer structure under the exchange layer structure is not limited to that shown in FIG. 1. For example, the underlayer 5 may be made of Cr or Cr-based alloy and formed to a thickness in a range of 5 to 40 nm on the substrate 1, and the exchange layer structure may be provided on this underlayer 5.

Next, a description will be given of a second embodiment of the magnetic recording medium according to the present invention.

Figure 2:
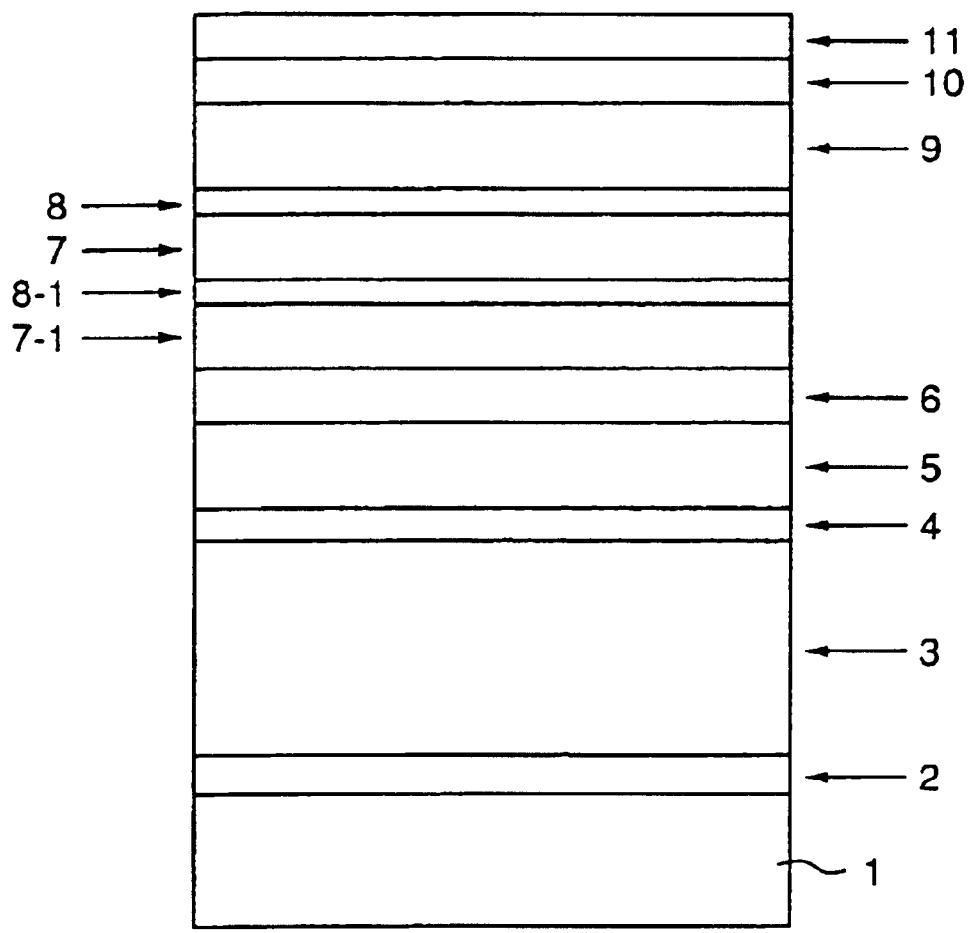
FIG. 2 is a cross sectional view showing an important part of a second embodiment of the magnetic recording medium according to the present invention.

FIG. 2 is a cross sectional view showing an important part of the second embodiment of the magnetic recording medium. In FIG. 2, those parts which are the same as those corresponding parts in FIG. 1 are designated by the same reference numerals, and a description thereof will be omitted.

In this second embodiment of the magnetic recording medium, the exchange layer structure includes two non-magnetic coupling layers 8 and 8-1, and two ferromagnetic layers 7 and 7-1, which form a ferrimagnetic multilayer. This arrangement increases the effective magnetization and signal, since the magnetizations of the two non-magnetic coupling layers 8 and 8-1 cancel each other instead of a portion of the magnetic layer 9. As a result, the grain volume and thermal stability of magnetization of the magnetic layer 9 are effectively increased. More bilayer structures made up of the pair of ferromagnetic layer and non-magnetic coupling layer may be provided additionally to increase the effective grain volume, as long as the easy axis of magnetization are appropriately oriented for the subsequently provided layers.

The ferromagnetic layer 7-1 is made of a material similar to that of ferromagnetic layer 7, and has a thickness range selected similarly to the ferromagnetic layer 7. In addition, the non-magnetic coupling layer 8-1 is made of a material similar to that of the non-magnetic coupling layer 8, and has a thickness range selected similarly to the non-magnetic coupling layer 8. Within the ferromagnetic layers 7-1 and 7, the c-axes are preferably in-plane and the grain growth columnar.

In this embodiment, the magnetic anisotropy of the ferromagnetic layer 7-1 is preferably higher than that of the ferromagnetic layer 7. However, the magnetic anisotropy of the ferromagnetic layer 7-1 may be the same as or, be higher than that of, the magnetic layer 9.

Furthermore, a remanent magnetization and thickness product of the ferromagnetic layer 7 may be smaller than that of the ferromagnetic layer 7-1.

Figure 3:
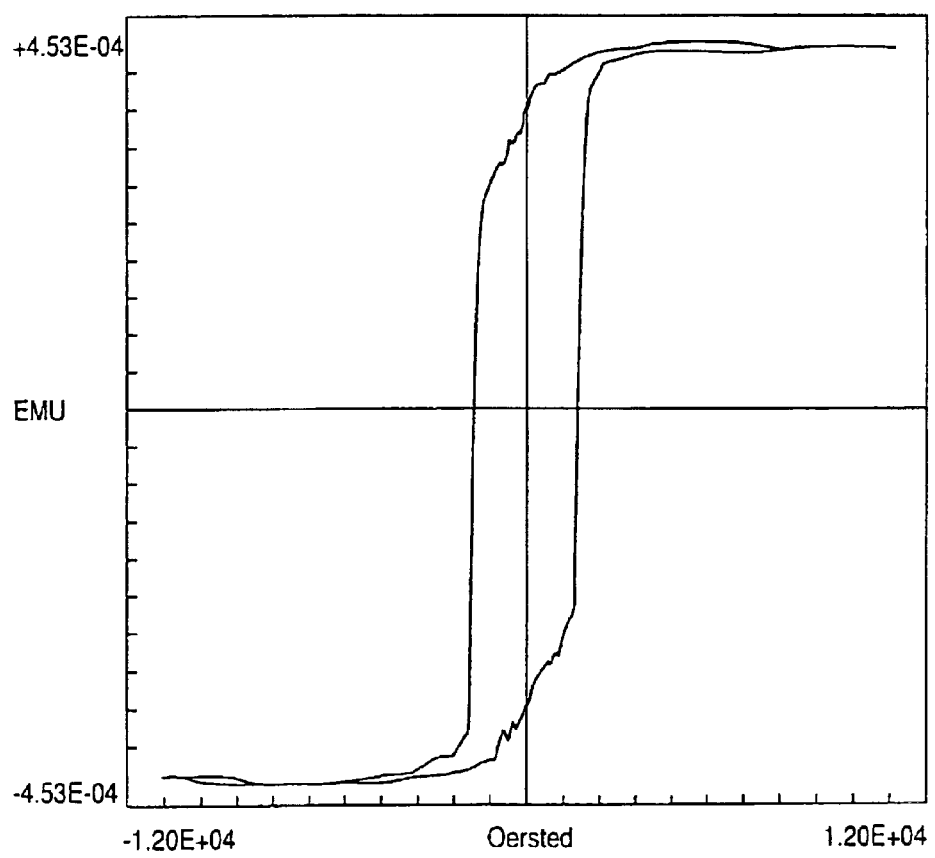
FIG. 3 is a diagram showing an in-plane magnetization curve of a single CoPt layer having a thickness of 10 nm on a Si substrate.

FIG. 3 is a diagram showing an in-plane magnetization curve of a single CoPt layer having a thickness of 10 nm on a Si substrate. In FIG. 3, the ordinate indicates the magnetization (emu), and the abscissa indicates the magnetic field (Oe). Conventional magnetic recording media show a behavior similar to that shown in FIG. 3.

Figure 4:
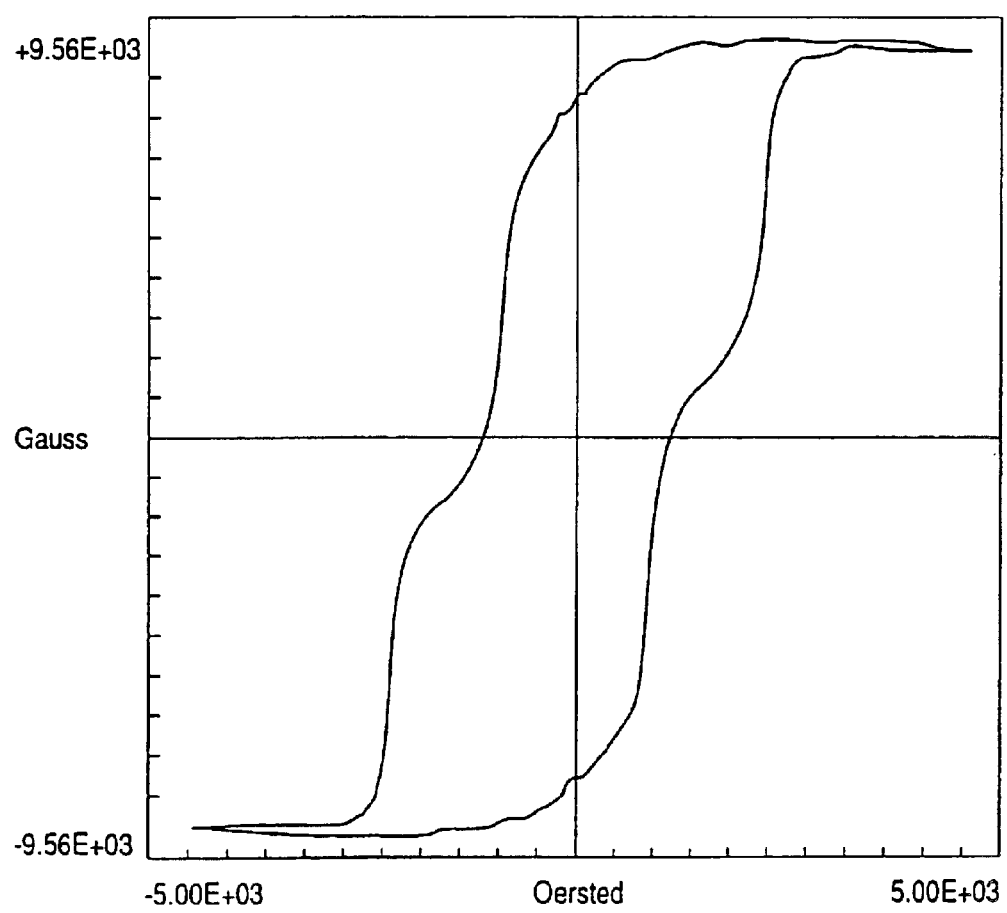
FIG. 4 is a diagram showing an in-plane magnetization curve of two CoPt layers separated by a Ru layer having a thickness of 0.8 nm.

FIG. 4 is a diagram showing an in-plane magnetization curve of two CoPt layers separated by a Ru layer having a thickness of 0.8 nm, as in the case of the first embodiment of the magnetic recording medium. In FIG. 4, the ordinate indicates the magnetization (Gauss), and the abscissa indicates the magnetic field (Oe). As may be seen from FIG. 4, the loop shows shifts near the magnetic field which indicate the antiparallel coupling.

Figure 5:
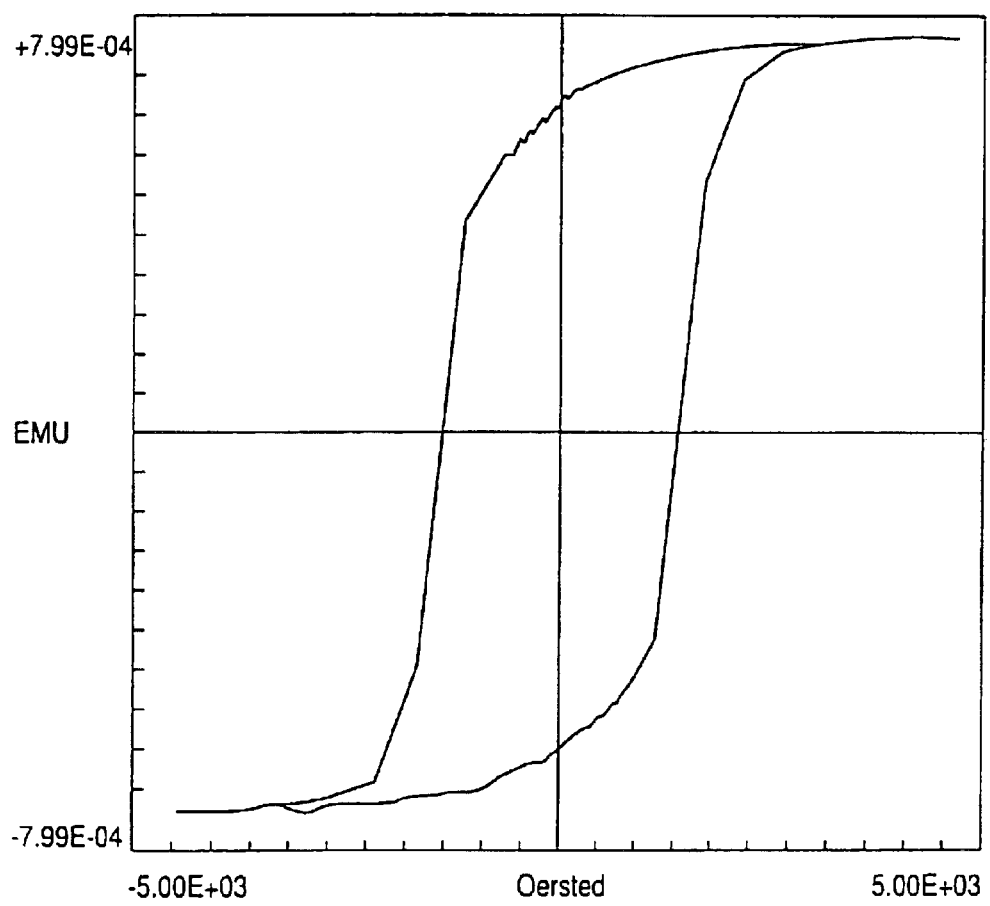
FIG. 5 is a diagram showing an in-plane magnetization curve of two CoPt layers separated by a Ru layer having a thickness of 1.4 nm.

FIG. 5 is a diagram showing an in-plane magnetization curve of two CoPt layers separated by a Ru layer having a thickness of 1.4 nm. In FIG. 5, the ordinate indicates the magnetization (emu), and the abscissa indicates the magnetic field (Oe). As may be seen from FIG. 5, the magnetizations of the two CoPt layers are parallel.

Figure 6:
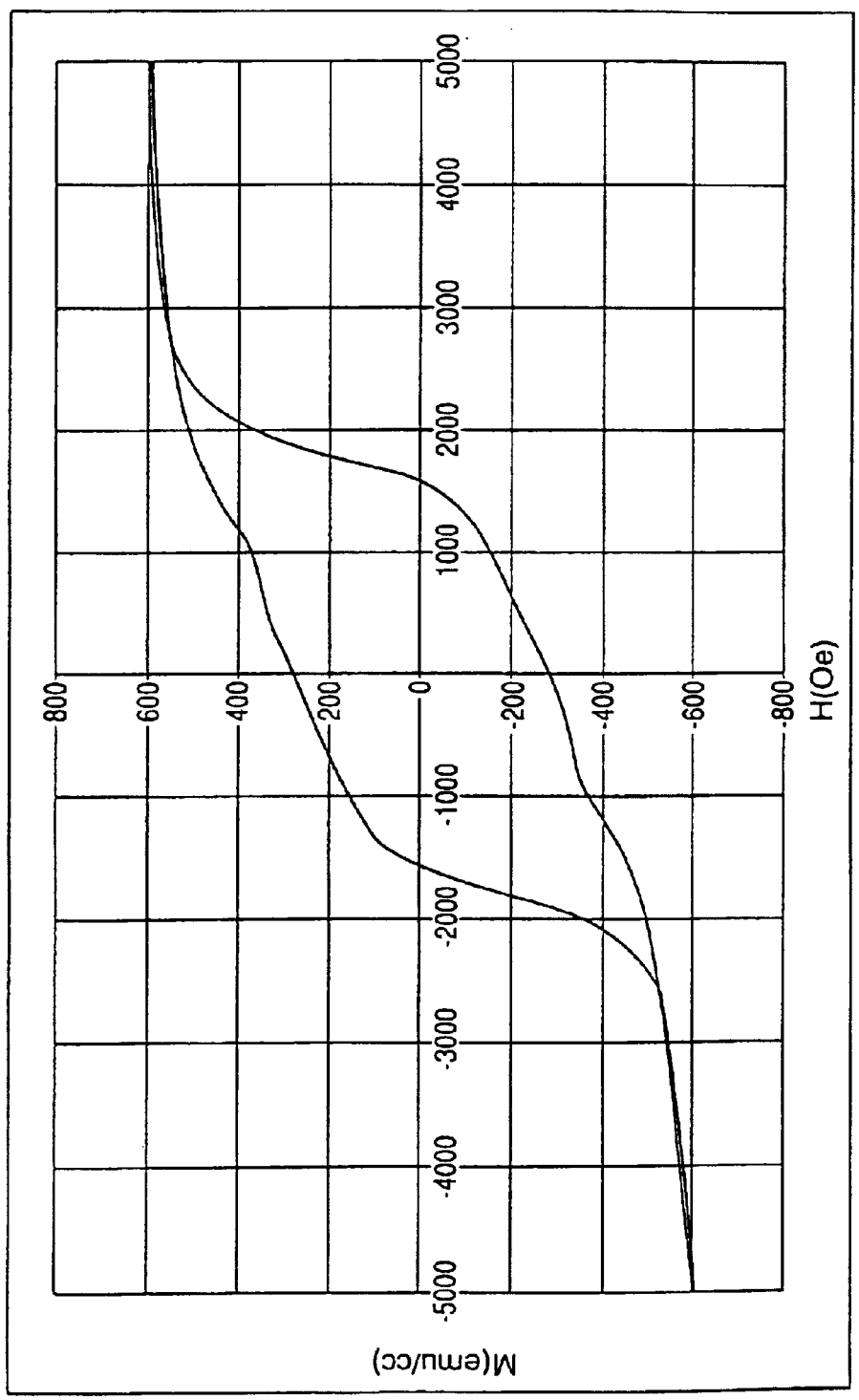
FIG. 6 is a diagram showing an in-plane magnetization curve two CoCrPt layers separated by a Ru having a thickness of 0.8 nm.

FIG. 6 is a diagram showing an in-plane magnetization curve for two CoCrPt layers separated by a Ru having a thickness of 0.8 nm, as in the case of the second embodiment of the magnetic recording medium. In FIG. 6, the ordinate indicates the magnetization (emu/cc), and the abscissa indicates the field (Oe). As may be seen from FIG. 6, the loop shows shifts near the field which indicate the antiparallel coupling.

From FIGS. 3 and 4, it may be seen that the antiparallel coupling can be obtained by the provision of the exchange layer structure. In addition, it may be seen by comparing FIG. 5 with FIGS. 4 and 6, the non-magnetic coupling layer 8 is desirably in the range of 0.4 to 0.9 nm in order to achieve the antiparallel coupling.

Therefore, according to the first and second embodiments of the magnetic recording medium, it is possible to effectively increase the apparent grain volume of the magnetic layer by the exchange coupling provided between the magnetic layer and the ferromagnetic layer via the non-magnetic coupling layer, without sacrificing the resolution. In other words, the apparent thickness of the magnetic layer is increased with regard to the grain volume of the magnetic layer so that a thermally stable medium can be obtained, and in addition, the effective thickness of the magnetic layer is maintained since cancellation of signals especially from the bottom layers is achieved. This allows higher linear density recording that is otherwise not possible for thick media. As a result, it is possible to obtain a magnetic recording medium with reduced medium noise and thermally stable performance.

Figure 7:
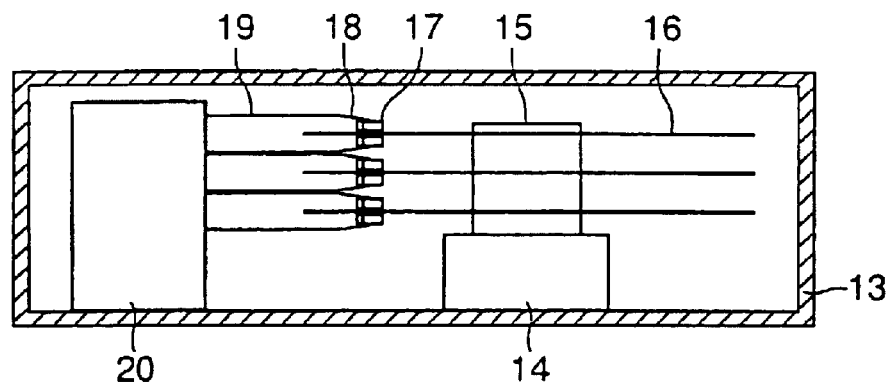
FIG. 7 is a cross sectional view showing an important part of an embodiment of the magnetic storage apparatus according to the present invention.

Next, a description will be given of an embodiment of a magnetic storage apparatus according to the present invention, by referring to FIGS. 7 and 8. FIG. 7 is a cross sectional view showing an important part of this embodiment of the magnetic storage apparatus, and FIG. 8 is a plan view showing the important part of this embodiment of the magnetic storage apparatus.

Figure 8:
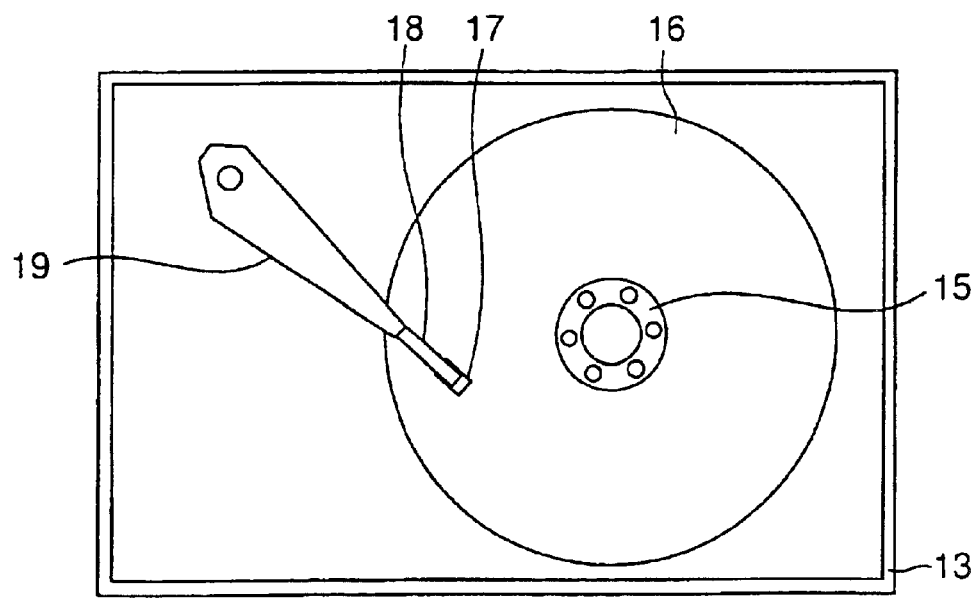
FIG. 8 is a plan view showing the important part of the embodiment of the magnetic storage apparatus.

As shown in FIGS. 7 and 8, the magnetic storage apparatus generally includes a housing 13. A motor 14, a hub 15, a plurality of magnetic recording media 16, a plurality of recording and reproducing heads 17, a plurality of suspensions 18, a plurality of arms 19, and an actuator unit 20 are provided within the housing 13. The magnetic recording media 16 are mounted on the hub 15 which is rotated by the motor 14. The recording and reproducing head 17 is made up of a reproducing head such as a MR or GMR head, and a recording head such as an inductive head. Each recording and reproducing head 17 is mounted on the tip end of a corresponding arm 19 via the suspension 18. The arms 19 are moved by the actuator unit 20. The basic construction of this magnetic storage apparatus is known, and a detailed description thereof will be omitted in this specification.

This embodiment of the magnetic storage apparatus is characterized by the magnetic recording media 16. Each magnetic recording medium 16 has the structure of the first or second embodiment of the magnetic recording medium described above in conjunction with FIGS. 1 and 2. Of course, the number of magnetic recording media 16 is not limited to three, and only one, two or four or more magnetic recording media 16 may be provided.

The basic construction of the magnetic storage unit is not limited to that shown in FIGS. 7 and 8. In addition, the magnetic recording medium used in the present invention is not limited to a magnetic disk.

In the magnetic recording medium having the exchange layer structure such as that of the first embodiment shown in FIG. 1, when Ru is used for the non-magnetic coupling layer 8 and a CoCr-based alloy is used for the magnetic layer 9, both of these layers 8 and 9 have the hcp structure. In order to increase both the coercivity and resolution of the magnetic recording medium, it is desirable that the c-axis of the hcp structure is parallel with respect to the surface of the substrate 1. In a case where a CoCr-based alloy is used for the ferromagnetic layer 7, the ferromagnetic layer 7 is grown epitaxially on the non-magnetic intermediate layer 6 which is made of an alloy having the hcp structure and oriented on the (002) face, and thus, the in-plane orientation of the c-axis of the ferromagnetic layer 7 is very satisfactory.

On the other hand, the Ru which is used for the non-magnetic coupling layer 8 has the hcp structure, similarly as in the case of the CoCr-based alloy, but the lattice constant of Ru is approximately 5% larger than the lattice constant of the CoCr-based alloy. For this reason, the epitaxial growth may be slightly obstructed due to the lattice mismatch between the ferromagnetic layer 7 and the non-magnetic coupling layer 8 or, between the non-magnetic coupling layer 8 and the magnetic layer 9. If the epitaxial growth is slightly obstructed due to the lattice mismatch, the coercivity of the magnetic recording medium decreases, and the in-plane orientation of the c-axis of the CoCr-based alloy becomes unstable.

Next, a description will be given of an embodiment which can improve the epitaxial growth between the Ru and the CoCr-based alloy, simultaneously increase the coercivity of the magnetic recording medium and improve the in-plane orientation of the c-axis of the CoCr-based alloy, and improve mainly the recording resolution characteristic of the magnetic recording medium.

Figure 9:
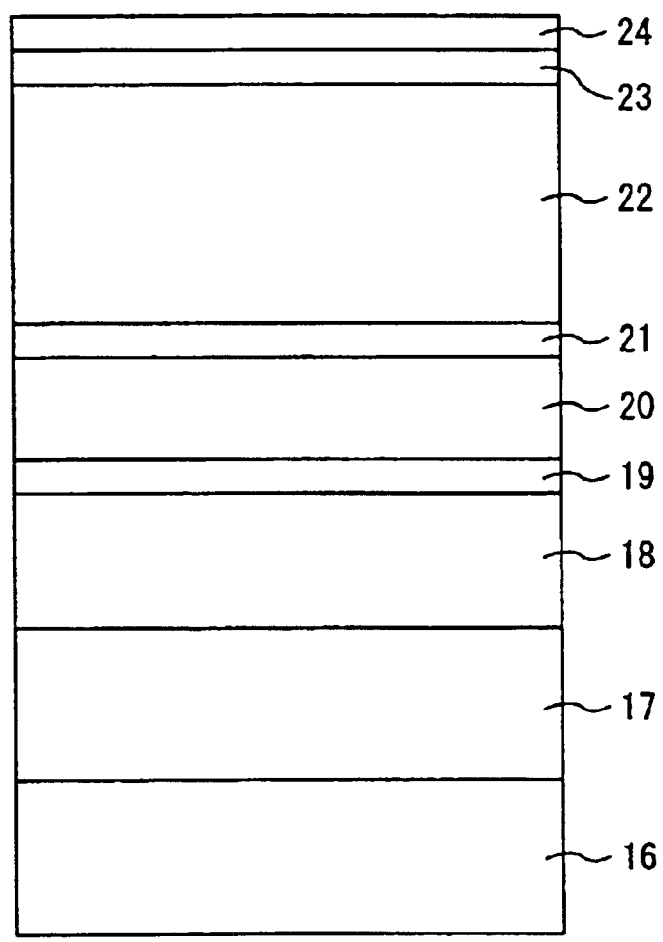
FIG. 9 is a cross sectional view showing an important part of a third embodiment of the magnetic recording medium according to the present invention.

FIG. 9 is a cross sectional view showing an important part of a third embodiment of the magnetic recording medium according to the present invention.

The magnetic recording medium includes a non-magnetic substrate 16, a seed layer 17, an underlayer 18 made of a Cr-based alloy, a non-magnetic intermediate layer 19, a ferromagnetic layer 20, a non-magnetic coupling layer 21, a magnetic layer 22, a protection layer 23, and a lubricant layer 24 which are stacked in this order as shown in FIG. 9.

The non-magnetic substrate 16 is made of an Al alloy or glass, for example. The non-magnetic substrate 16 may or may not be mechanically textured. The seed layer 17 is made of NiP which is plated in a case where the non-magnetic substrate 16 is made of the Al alloy. The NiP seed layer 17 may or may not be mechanically textured. On the other hand, in a case where the non-magnetic substrate 16 is made of glass, the seed layer 17 is made of an intermetallic compound material having the B2 structure, such as NiAl and FeAl.

The non-magnetic intermediate layer 19 is provided to promote the epitaxial growth of the magnetic layer 22, reduction of the grain size distribution with of the magnetic layer 22, and the anisotropic axis (c-axis, axis of easy magnetization) orientation of the magnetic layer 22 along a plane parallel to the recording surface of the magnetic recording medium. The non-magnetic intermediate layer 19 is made of an alloy having the hcp structure, such as CoCr-M1, and has a thickness in a range of approximately 1 to 5 nm, where M1=B, Mo, Bn, Ta, W or alloys thereof.

The ferromagnetic layer 20 is made of a material selected from a group of Co, Ni, Fe, Co-based alloys, Ni-based alloys, Fe-based alloys and the like. In other words, Co-based alloys including CoCrTa, CoCrPt and CoCrPt-M2 may be used for the ferromagnetic layer 20, where M2=B. Mo, Nb, Ta. W or alloys thereof. The ferromagnetic layer 20 has a thickness in a range of approximately 2 to 10 nm.

The non-magnetic coupling layer 21 is made of an alloy having the hcp structure, such as Ru-M3, where M3=Co. Cr, Fe, Ni, Mn or alloys thereof. For example, the non-magnetic coupling layer 21 has a thickness in a range of approximately 0.4 to 1.0 nm, and preferably in a range of approximately 0.6 to 0.8 nm. By setting the thickness of the non-magnetic coupling layer 21 within such a range, the magnetizations of the ferromagnetic layer 20 and the magnetic layer 22 become antiparallel. Accordingly, the ferromagnetic layer 20 and the non-magnetic coupling layer 19 form an exchange layer structure.

The magnetic layer 22 is made of a material selected from a group of Co and Co-based alloys including CoCrTa, CoCrPt, and CoCrPt-M4, where M4=B, Mo. Nb, Ta, W or alloys thereof. The magnetic layer 22 has a thickness in a range of approximately 5 to 30 nm. Of course, the magnetic layer 22 is not limited to a single-layer structure, and a multi-layer structure may be used for the magnetic layer 22.

The protection layer 23 is made of C or diamond-like C (DLC). In addition, the lubricant layer 24 is made of an organic lubricant agent, in order to enable the magnetic recording medium to be used with a magnetic transducer such as a spin valve head. The protection layer 23 and the lubricant layer 24 form a protection layer structure of the magnetic recording medium.

As described above, the non-magnetic coupling layer 21 is made of an alloy Ru-M3, where M3=Co, Cr. Fe. Ni, Mn or alloys thereof. In this embodiment, an amount of the element M3 added to the Ru is set within the following composition ranges so as to maintain a stable hcp structure. In the following composition ranges, the numerical values following the brackets respectively indicate the amount in atomic percent (at %).

Ru-Co(0 to 50 at %)
Ru-Cr(0 to 50 at %)
Ru-Fe(0 to 60 at %)
Ru-Ni(0 to 10 at %)
Ru-Mn(0 to 50 at %)

Figure 10:
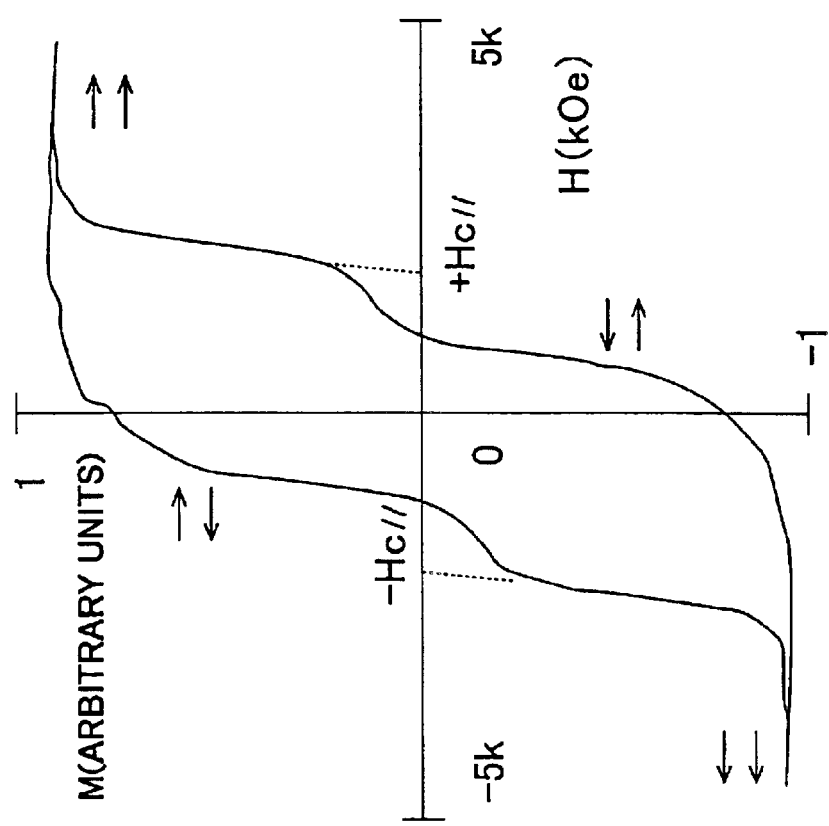
FIG. 10 is a diagram showing a magnetization curve which is obtained when pure Ru is used for a non-magnetic coupling layer of the magnetic recording medium.

FIG. 10 is a diagram showing a magnetization curve which is obtained when pure Ru is used for the non-magnetic coupling layer 21 of the magnetic recording medium shown in FIG. 9. In FIG. 10, the ordinate indicates the magnetization M (arbitrary units), and the abscissa indicates the magnetic field H (kOe). The magnetization curve shown in FIG. 10 was measured by a vibrating sample type magnetometer while applying a magnetic field parallel to the sample surface, that is, parallel to the recording surface of the magnetic recording medium. The magnetization curve has a constricted portion because of the existence of a region where the ferromagnetic layer 20 and the magnetic layer 22 form an antiparallel coupling.

In addition, a magnetization curve which is obtained when a Ru-M3 alloy is used for the non-magnetic coupling layer 21 was also measured similarly to the above. In the case where the Ru-M3 alloy is used for the non-magnetic coupling layer 21, it was also confirmed that a constricted portion is formed in the magnetization curve, similarly as in the case shown in FIG. 10, due to the existence of the region where the ferromagnetic layer 20 and the magnetic layer 22 form the antiparallel coupling.

In the first and fourth quadrants in FIG. 10, a linear portion of the magnetization curve on the higher magnetic field side of the constricted portion is extrapolated to the magnetic field axis, and the intersection with the magnetic field axis is defined as an in-plane coercivity $Hc//$.

Figure 11:
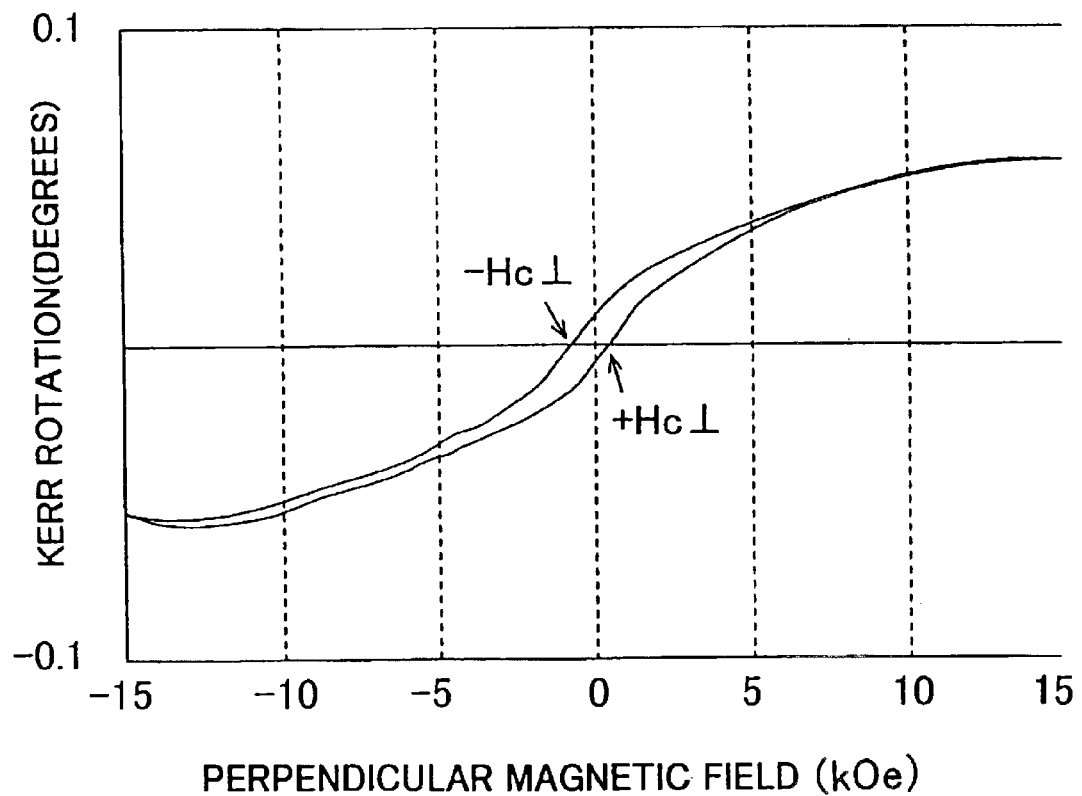
FIG. 11 is a diagram showing a magnetization curve which is measured by a vertical Kerr looper while applying a magnetic field in a perpendicular direction with respect to a sample surface.

FIG. 11 is a diagram showing a magnetization curve which is measured by a vertical Kerr looper (or loop) while applying a magnetic field in a perpendicular direction with respect to the sample surface, with respect to the magnetic recording medium for which the data shown in FIG. 10 were measured. In FIG. 11, the ordinate indicates the Kerr rotation (degrees), and the abscissa indicates the perpendicular magnetic field (Oe). A definition of a perpendicular coercivity $Hc\perp$ is shown in FIG. 11.

The extent of the in-plane orientation of the axis of easy magnetization of the magnetic layer 22 can be evaluated by a ratio $(Hc\perp)/(Hc//)$. The smaller this ratio $(Hc\perp)/(Hc//)$, the better the in-plane orientation of the magnetic layer 22.

Measured results of the in-plane coercivity $Hc//$ and the ratio $(Hc\perp)/(Hc//)$ for various materials used for the non-magnetic coupling layer 21 are shown in the following. In the following, the in-plane coercivity $Hc//$ of the various materials is indicated by a relative value relative to the in-plane coercivity $Hc//=1$ for the case where pure Ru is used for the non-magnetic coupling layer 21.

| Non-Magnetic Coupling Layer 21 | $Hc//$ (Relative Value) | $(Hc\perp)/(Hc//)$ |
| --- | --- | --- |
| Ru | 1 | 0.33 |
| Ru—Co (20 at %) | 1.10 | 0.23 |
| Ru—Cr (20 at %) | 1.05 | 0.25 |
| Ru—Fe (20 at %) | 1.07 | 0.28 |
| Ru—Mn (20 at %) | 0.96 | 0.30 |
| Ru—Ni (10 at %) | 0.94 | 0.30 |

Therefore, it was confirmed that the ratios $(Hc\perp)(Hc//)$ for the cases where the Ru-M3 alloys are used for the non-magnetic coupling layer 21 are improved according to this embodiment, as compared to the case where pure Ru is used for the non-magnetic coupling layer 21. As a result, it was confirmed that the recording resolution is improved by approximately 1.5 to 2.5% by the improved in-plane orientation of the magnetic layer 22.

A lattice mismatch of the intervals of the (002) faces of the hcp structure of the Ru used for the non-magnetic coupling layer 21 with respect to the magnetic layer 22 and the ferromagnetic layer 20 respectively disposed above and below the non-magnetic coupling layer 21 is normally approximately 5% at the maximum and approximately 8% in a worst case. But by the addition of the element M3 to the Ru, it was confirmed that the lattice mismatch can be reduced to approximately 6% or less, and preferably approximately 2% or less. Furthermore, the element M3 added to the Ru is preferably Co, Cr. Fe, Ni, Mn or alloys thereof, but it is of course possible to adjust the lattice mismatch by adding to the Ru a material selected from a group of Ir, Mo. Nb. Pt, Rh, Ta, Ti, V, W and alloys thereof.

Of course, this embodiment may be applied similarly to the construction of the second embodiment of the magnetic recording medium described above.

Further, the present invention is not limited to these embodiments, but various variations and modifications may be made without departing from the scope of the present invention.

What is claimed is:

1. A magnetic recording medium comprising:

at least one exchange layer structure; and a magnetic layer formed on said exchange layer structure, said exchange layer structure comprising a ferromagnetic layer, and a non-magnetic coupling layer provided on said ferromagnetic layer and under said magnetic layer, said ferromagnetic layer and said magnetic layer having antiparallel magnetizations, said non-magnetic coupling layer being made of a Ru-M3 alloy, where M3 is an element or alloy thereof selected from a group consisting of Co, Fe, Ni, and Mn, and a lattice mismatch between said non-magnetic coupling layer and said magnetic layer and said ferromagnetic layer respectively disposed above and below said non-magnetic coupling layer is adjusted to approximately 6% or less by addition of M3.

2. The magnetic recording medium as claimed in claim 1, wherein said non-magnetic coupling layer has a thickness in a range of 0.4 to 1.0 nm.

3. The magnetic recording medium as claimed in claim 1, wherein said ferromagnetic layer is made of a material selected from a group consisting of Co, Ni, Fe, Ni alloys, Fe alloys, and Co alloys.

4. The magnetic recording medium as claimed in claim 1, wherein said magnetic layer is made of a material selected from a group consisting of Co and Co alloys.

5. The magnetic recording medium as claimed in claim 1, wherein an amount of the element M3 added to Ru is 50 at % or less for Co, 60 at % or less for Fe, 10 at % or less for Ni, and 50 at % or less for Mn.

6. A magnetic storage apparatus comprising:

at least one magnetic recording medium comprising at least one exchange layer structure, and a magnetic layer formed on said exchange layer structure, said exchange layer structure comprising a ferromagnetic layer, and a non-magnetic coupling layer provided on said ferromagnetic layer and under said magnetic layer, said ferromagnetic layer and said magnetic layer having antiparallel magnetizations, said non-magnetic coupling layer being made of a Ru-M3 alloy, where M3 is an element or alloy thereof selected from a group consisting of Co, Fe, Ni, and Mn, and a lattice mismatch between said non-magnetic coupling layer and said magnetic layer and said ferromagnetic layer respectively disposed above and below said non-magnetic coupling layer is adjusted to approximately 6% or less by addition of M3.

7. The magnetic recording medium as claimed in claim 3, wherein said ferromagnetic layer is made of a Co alloy selected from a group consisting of CoCrTa, CoCrPt and CoCrPt-M2, where M2 is an element or alloy thereof selected from a group consisting of B, Mo, Nb, Ta, W, and Cu.

8. The magnetic recording medium as claimed in claim 4, wherein said magnetic layer is made of a Co alloy selected from a group consisting of CoCrTa, CoCrPt and CoCrPt-M4, where M4 is an element or alloy thereof selected from a group consisting of B, Mo, Nb, Ta, W, and Cu.

* * * * *